(12) United States Patent
Bolsinga et al.

(10) Patent No.: US 8,174,502 B2
(45) Date of Patent: May 8, 2012

(54) TOUCH EVENT PROCESSING FOR WEB PAGES

(75) Inventors: Gregory Dennis Bolsinga, San Francisco, CA (US); Tim Omernick, Mountain View, CA (US); Richard Williamson, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 743 days.

(21) Appl. No.: 12/042,237

(22) Filed: Mar. 4, 2008

(65) Prior Publication Data

US 2009/0225038 A1    Sep. 10, 2009

(51) Int. Cl.
*G06F 3/041* (2006.01)

(52) U.S. Cl. ......... 345/173; 345/660; 715/205; 715/234

(58) Field of Classification Search .......... 345/173–178; 178/18.01; 200/512; 340/407.1
See application file for complete search history.

(56) References Cited

U.S. PATENT DOCUMENTS

| | | | |
|---|---|---|---|
| 5,488,204 A | 1/1996 | Mead et al. |
| 5,534,893 A | 7/1996 | Hansen, Jr. et al. |
| 5,566,337 A | 10/1996 | Szymanski et al. |
| 5,627,567 A | 5/1997 | Davidson |
| 5,627,959 A | 5/1997 | Brown et al. |
| 5,745,116 A | 4/1998 | Pisutha-Arnond |
| 5,818,455 A | 10/1998 | Stone et al. |
| 5,880,411 A | 3/1999 | Gillespie et al. |
| 5,903,902 A | 5/1999 | Orr et al. |
| 5,917,477 A | 6/1999 | Lee |
| 6,028,602 A | 2/2000 | Weidenfeller et al. |
| 6,188,391 B1 | 2/2001 | Seely et al. |
| 6,259,436 B1 | 7/2001 | Moon et al. |
| 6,323,846 B1 | 11/2001 | Westerman et al. |
| 6,486,896 B1 | 11/2002 | Ubillos |
| 6,570,557 B1 | 5/2003 | Westerman |
| 6,636,242 B2 | 10/2003 | Bowman-Amuah |
| 6,639,584 B1 | 10/2003 | Li |
| 6,664,989 B1 | 12/2003 | Snyder et al. |
| 6,677,932 B1 | 1/2004 | Westerman |
| 6,677,965 B1 | 1/2004 | Ullmann et al. |
| 6,714,936 B1 | 3/2004 | Nevin, III |
| 6,741,996 B1 | 5/2004 | Brechner et al. |
| 6,765,557 B1 | 7/2004 | Segal et al. |

(Continued)

FOREIGN PATENT DOCUMENTS

CN    1841284 A    10/2006

(Continued)

OTHER PUBLICATIONS

Authorized officer Masashi Honda, International Preliminary Report on Patentability in PCT/US2009/35856 mailed Sep. 16, 2010, 7 pages.

(Continued)

*Primary Examiner* — Kevin M Nguyen
*Assistant Examiner* — Kenneth B Lee, Jr.
(74) *Attorney, Agent, or Firm* — Morgan, Lewis & Bockius LLP

(57) ABSTRACT

One or more touch input signals can be obtained from a touch sensitive device. If the touch input signals are associated with one or more regions of a web page displayed on the touch sensitive device, a touch event associated with the regions of a web page is processed by the web page. Otherwise, the touch events can be processed by an application (e.g., a browser).

22 Claims, 6 Drawing Sheets

U.S. PATENT DOCUMENTS

| | | | |
|---|---|---|---|
| 6,778,992 | B1 | 8/2004 | Searle et al. |
| 6,839,721 | B2 | 1/2005 | Schwols |
| 6,903,927 | B2 | 6/2005 | Anlauff |
| 6,957,392 | B2 | 10/2005 | Simister et al. |
| 6,958,749 | B1 | 10/2005 | Matsushita et al. |
| 6,985,137 | B2 | 1/2006 | Kaikuranta |
| 7,009,626 | B2 | 3/2006 | Anwar |
| 7,023,427 | B2 | 4/2006 | Kraus et al. |
| 7,088,374 | B2 | 8/2006 | David et al. |
| 7,117,453 | B2 | 10/2006 | Drucker et al. |
| 7,173,623 | B2 | 2/2007 | Calkins et al. |
| 7,337,412 | B2 | 2/2008 | Guido et al. |
| 7,346,850 | B2 | 3/2008 | Swartz et al. |
| 7,487,447 | B1* | 2/2009 | Jerger ............................ 715/252 |
| 7,561,159 | B2 | 7/2009 | Abel et al. |
| 7,576,732 | B2 | 8/2009 | Lii |
| 7,653,883 | B2 | 1/2010 | Hotelling et al. |
| 7,750,893 | B2* | 7/2010 | Hashimoto et al. ............ 345/173 |
| 7,812,826 | B2* | 10/2010 | Ording et al. .................. 345/173 |
| 7,864,037 | B2 | 1/2011 | Miller |
| 7,917,584 | B2 | 3/2011 | Arthursson |
| 8,051,406 | B2 | 11/2011 | Knight et al. |
| 2001/0011998 | A1 | 8/2001 | Agata et al. |
| 2001/0045949 | A1 | 11/2001 | Chithambaram et al. |
| 2002/0194589 | A1 | 12/2002 | Cristofalo et al. |
| 2003/0071858 | A1 | 4/2003 | Morohoshi |
| 2003/0080946 | A1 | 5/2003 | Chuang |
| 2003/0095096 | A1 | 5/2003 | Robbin et al. |
| 2003/0122787 | A1 | 7/2003 | Zimmerman et al. |
| 2003/0132959 | A1 | 7/2003 | Simister et al. |
| 2003/0160832 | A1 | 8/2003 | Ridgley et al. |
| 2003/0174149 | A1 | 9/2003 | Fujisaki et al. |
| 2003/0197689 | A1 | 10/2003 | May |
| 2004/0021676 | A1 | 2/2004 | Chen et al. |
| 2004/0021698 | A1 | 2/2004 | Baldwin et al. |
| 2004/0100479 | A1 | 5/2004 | Nakano et al. |
| 2004/0160419 | A1 | 8/2004 | Padgitt |
| 2004/0215643 | A1 | 10/2004 | Brechner et al. |
| 2004/0222992 | A1 | 11/2004 | Calkins et al. |
| 2004/0224638 | A1 | 11/2004 | Fadell et al. |
| 2005/0017957 | A1 | 1/2005 | Yi |
| 2005/0057524 | A1 | 3/2005 | Hill et al. |
| 2005/0088443 | A1 | 4/2005 | Blanco et al. |
| 2005/0162402 | A1* | 7/2005 | Watanachote ................. 345/173 |
| 2005/0193015 | A1 | 9/2005 | Logston et al. |
| 2005/0268247 | A1 | 12/2005 | Baneth |
| 2006/0010400 | A1 | 1/2006 | Dehlin et al. |
| 2006/0026521 | A1 | 2/2006 | Hotelling et al. |
| 2006/0036955 | A1 | 2/2006 | Baudisch et al. |
| 2006/0038796 | A1 | 2/2006 | Hinckley et al. |
| 2006/0097991 | A1 | 5/2006 | Hotelling et al. |
| 2006/0161871 | A1 | 7/2006 | Hotelling et al. |
| 2006/0190833 | A1 | 8/2006 | SanGiovanni et al. |
| 2006/0197753 | A1 | 9/2006 | Hotelling |
| 2006/0236263 | A1 | 10/2006 | Bathiche et al. |
| 2007/0050469 | A1 | 3/2007 | Gupta et al. |
| 2007/0055967 | A1 | 3/2007 | Poff et al. |
| 2007/0075965 | A1 | 4/2007 | Huppi et al. |
| 2007/0152976 | A1 | 7/2007 | Townsend et al. |
| 2007/0174257 | A1 | 7/2007 | Howard |
| 2007/0185876 | A1 | 8/2007 | Mendis et al. |
| 2007/0242056 | A1 | 10/2007 | Engelhardt et al. |
| 2007/0252821 | A1 | 11/2007 | Hollemans et al. |
| 2007/0288856 | A1 | 12/2007 | Butlin et al. |
| 2008/0005703 | A1 | 1/2008 | Radivojevic et al. |
| 2008/0016096 | A1 | 1/2008 | Wilding et al. |
| 2008/0034029 | A1 | 2/2008 | Fang et al. |
| 2008/0048978 | A1 | 2/2008 | Trent, Jr. et al. |
| 2008/0094368 | A1 | 4/2008 | Ording et al. |
| 2008/0158191 | A1* | 7/2008 | Yang et al. .................... 345/173 |
| 2008/0165132 | A1 | 7/2008 | Weiss et al. |
| 2008/0168395 | A1 | 7/2008 | Ording et al. |
| 2008/0218489 | A1 | 9/2008 | Park et al. |
| 2008/0231610 | A1 | 9/2008 | Hotelling et al. |
| 2009/0049388 | A1 | 2/2009 | Taib et al. |
| 2009/0058830 | A1 | 3/2009 | Herz et al. |
| 2009/0207140 | A1 | 8/2009 | Hansson |
| 2009/0211891 | A1 | 8/2009 | Lai et al. |
| 2009/0225037 | A1 | 9/2009 | Williamson et al. |
| 2009/0225038 | A1 | 9/2009 | Bolsinga et al. |
| 2009/0225039 | A1 | 9/2009 | Williamson et al. |
| 2009/0259969 | A1 | 10/2009 | Pallakoff |
| 2009/0322699 | A1 | 12/2009 | Hansson |
| 2009/0322700 | A1 | 12/2009 | D'Souza et al. |
| 2010/0020221 | A1 | 1/2010 | Tupman et al. |
| 2010/0146458 | A1 | 6/2010 | Wadekar |
| 2010/0149122 | A1 | 6/2010 | Lin |
| 2011/0037714 | A1 | 2/2011 | Seo et al. |

FOREIGN PATENT DOCUMENTS

| | | |
|---|---|---|
| EP | 1 517 228 | 3/2005 |
| EP | 1517228 | 3/2005 |
| GB | 2 319 591 A | 5/1998 |
| GB | 2351639 A | 1/2001 |
| JP | 05 298002 | 11/1993 |
| JP | 2001 290585 | 10/2001 |
| JP | 2005 056286 | 3/2005 |
| JP | 2005 082086 | 3/2005 |
| JP | 2005056286 | 3/2005 |
| JP | 2005082086 | 3/2005 |
| JP | 2008 146165 | 6/2008 |
| JP | 2008146165 | 6/2008 |
| WO | WO 02/08881 | 1/2002 |
| WO | WO 02/13176 A2 | 2/2002 |
| WO | WO 2006/067711 A2 | 6/2006 |
| WO | WO 2006/094308 | 9/2006 |
| WO | WO2006/094308 | 9/2006 |
| WO | WO 2006/128248 A1 | 12/2006 |
| WO | WO 2007/079425 A2 | 7/2007 |
| WO | WO 2007/089766 | 8/2007 |
| WO | WO 2008/030879 A2 | 3/2008 |
| WO | WO 2008/030880 A1 | 3/2008 |
| WO | WO 2008/085848 A1 | 7/2008 |
| WO | WO 2008/085877 A1 | 7/2008 |
| WO | WO 2009/018314 A2 | 2/2009 |
| WO | WO 2009/111189 A1 | 9/2009 |
| WO | WO 2009/111458 | 9/2009 |
| WO | WO 2009/111460 | 9/2009 |
| WO | WO 2009/111469 | 9/2009 |

OTHER PUBLICATIONS

Authorized officer Masashi Honda, International Preliminary Report on Patentability in PCT/US2009/35858 mailed Sep. 16, 2010, 7 pages.

Authorized officer Simin Baharlou, International Preliminary Report on Patentability in PCT/US2009/35874 mailed Sep. 16, 2010, 8 pages.

Pixley, "Document Object Model (DOM) Level 2 Events Specifications Version 1.0", W3C Recommendation, pp. 1-47, Nov. 13, 2000.

International Search Report and Written Opinion, dated Jul. 3, 2009, issued in International Application No. PCT/US2009/035856.

International Search Report and Written Opinion, dated Jul. 3, 2009, issued in International Application No. PCT/US2009/035858.

International Search Report and Written Opinion, dated Nov. 11, 2009, issued in International Application No. PCT/US2009/035874.

Anonymous, "Firegestures", Internet Article [Online] [Retrieved on Oct. 27, 2009]; Retrieved from the Internet at URL: http://xuldev.org/firegestures/; 2 pages. XP002552760.

Anonymous, "Firegestures: Changelog", Internet Article [Online] [Retrieved on Oct. 28, 2009]; Retrieved from the Internet at URL: http://xuldev.org/firegestures/changelog.php; 8 pages. XP002552761.

Anonymous, "Firegestures Version History", Internet Article [Online] [Retrieved on Oct. 28, 2009]; Retrieved from the Internet at URL: http://addons.mozilla.org/en-US/firefox/addons/versions/6366; 6 pages. XP002552762.

Holzner, "JavaScript Complete", 1998, McGraw/Hill, New York, pp. 71-79. XP002552763.

"Document Object Model (DOM) Level 2 Events Specification Version 1.0" W3C Recommendation, Nov. 13, 2000, pp. 1-47.

Notification of Transmittal of International Search Report and the Written Opinion of the International Searching Authority, or the Declaration for PCT/US2009/035856 dated Jul. 3, 2009.

KennyTM, "UIGestureRecognizer," from iPhone Development Wiki, Oct. 31, 2009, 3 pages, http://iphonedevwiki.net/index.php?title=UIGestureRecognizer&oldid=319http://iphonedevwiki.net/index.php?title=UIGestureRecognizer&action=history.

Masui et al., "Elastic Graphical Interfaces for Precise Data Manipulation," ACM Conference on Human Factors in Computing Systems (CHI '95), Apr. 1995, Conference Companion, ACM press, pp. 143-144.

Räihä, L., "Delegation: Dynamic Specialization," Proceeding of the conference on TRI-Ada '94, pp. 172-179.

Rogers, M., "It's for You! An iPhone Development Primer for the Busy College Professor," Journal of Computing Sciences in Colleges, vol. 25, No. 1, Oct. 1, 2009, pp. 94-101.

Invitation to Pay Additional Fees dated Jul. 13, 2010, received in International Application No. PCT/US2010/027118, which corresponds to U.S. Appl. No. 12/566,660 (Moore).

International Search Report and Written Opinion dated Oct. 5, 2010, received in International Application No. PCT/US2010/027118, which corresponds to U.S. Appl. No. 12/566,660 (Moore).

International Search Report and Written Opinion dated May 20, 2011, received in International Application No. PCT/US2011/022516, which corresponds to U.S. Appl. No. 12/789,695 (Moore).

International Search Report dated Apr. 16, 2009, received in International Application No. PCT/US2009/034772, which corresponds to U.S. Appl. No. 12/042,318 (Platzer).

European Search Report dated Apr. 21, 2009, received in European Application No. 09154313.2, which corresponds to U.S. Appl. No. 12/042,318 (Platzer).

International Search Report and Written Opinion dated Jul. 31, 2008, received in International Application No. PCT/US2008/000058, which corresponds to U.S. Appl. No. 11/620,709 (Platzer).

International Preliminary Report on Patentability dated Jul. 7, 2009, received in International Application No. PCT/US2008/000058, which corresponds to U.S. Appl. No. 11/620,709 (Platzer).

International Search Report and Written Opinion dated Apr. 22, 2008, received in International Application No. PCT/US2008/000060, which corresponds to U.S. Appl. No. 11/620,727 (Blumenberg).

International Preliminary Report on Patentability dated Jul. 7, 2009, received in International Application No. PCT/US2008/000060, which corresponds to U.S. Appl. No. 11/620,727 (Blumenberg).

International Search Report and Written Opinion dated May 2, 2008, received in International Application No. PCT/US2008/000069, which corresponds to U.S. Appl. No. 11/620,715 (Platzer).

International Preliminary Report on Patentability dated Jul. 7, 2009, received in International Application No. PCT/US2008/000069, which corresponds to U.S. Appl. No. 11/620,715 (Platzer).

International Search Report and Written Opinion dated Jun. 4, 2008, received in International Application No. PCT/US2008/000089, which corresponds to U.S. Appl. No. 11/620,717 (Platzer).

International Preliminary Report on Patentability dated Jul. 7, 2009, received in International Application No. PCT/US2008/000089, which corresponds to U.S. Appl. No. 11/620,717 (Platzer).

International Search Report and Written Opinion dated Jun. 3, 2008, received in International Application No. PCT/US2008/000103, which corresponds to U.S. Appl. No. 11/620,723 (Platzer).

International Preliminary Report on Patentability dated Jul. 7, 2009, received in International Application No. PCT/US2008/000103, which corresponds to U.S. Appl. No. 11/620,723 (Platzer).

Office Action dated Feb. 16, 2011, received in U.S. Appl. No. 12/042,318 (Beaver).

Office Action dated Sep. 15, 2011, received in U.S. Appl. No. 12/042,318 (Beaver).

Office Action dated Feb. 25, 2011, received in Australian Patent Application No. 2009200493, which corresponds to U.S. Appl. No. 12/042,318 (Beaver).

Office Action dated Aug. 9, 2011, received in Australian Patent Application No. 2009200493, which corresponds to U.S. Appl. No. 12/042,318 (Beaver).

Grant for Invention Patent dated Mar. 22, 2011, received in Chinese Patent Application No. ZL200910118596.4, which corresponds to U.S. Appl. No. 12/042,318 (Beaver).

Office Action dated Mar. 2, 2011, received in European Patent Application No. 11150786.9, which corresponds to U.S. Appl. No. 12/042,318 (Beaver).

Office Action dated Aug. 26, 2011, received in Japanese Patent Application No. 2009-080377, which corresponds to U.S. Appl. No. 12/042,318 (Beaver).

Office Action dated Jan. 18, 2011, received in U.S. Appl. No. 12/042,067 (Williamson).

Final Office Action dated Jul. 28, 2011, received in U.S. Appl. No. 12/042,067 (Williamson).

Office Action dated Oct. 19, 2011, received in Chinese Patent Application No. 200980000014.0, which corresponds to U.S. Appl. No. 12/042,067 (Williamson).

Office Action dated Oct. 19, 2010, received in German Patent Application No. 11 2009 000 001.0, which corresponds to U.S. Appl. No. 12/042,067 (Williamson).

Office Action dated Oct. 15, 2010, received in European Patent Application No. 09 700 006.1, which corresponds to U.S. Appl. No. 12/042,067 (Williamson).

Office Action dated Jan. 4, 2011, received in U.S. Appl. No. 12/042,299 (Williamson).

Final Office Action dated Jul. 8, 2011, received in U.S. Appl. No. 12/042,299 (Williamson).

Office Action dated Oct. 26, 2011, received in Chinese Patent Application No. 200980000013.6, which corresponds to U.S. Appl. No. 12/042,299 (Williamson).

Office Action dated Aug. 10, 2010, received in German Patent Application No. 11 2009 000 003.7, which corresponds to U.S. Appl. No. 12/042,299 (Williamson).

Office Action dated Nov. 26, 2010, received in European Patent Application No. 09 700 007.9, which corresponds to U.S. Appl. No. 12/402,299 (Williamson).

Office Action dated Aug. 3, 2011, received in Japanese Patent Application No. 2010 502358, which corresponds to U.S. Appl. No. 12/042,299 (Williamson).

Office Action dated Jul. 14, 2011, received in Chinese Patent Application No. 200980000015.5, which corresponds to U.S. Appl. No. 12/042,237 (Bolsinga).

Office Action dated Apr. 1, 2009, received in U.S. Appl. No. 11/620,709 (Platzer).

Final Office Action dated Nov. 13, 2009, received in U.S. Appl. No. 11/620,709 (Platzer).

Office Action dated Jun. 9, 2010, received in U.S. Appl. No. 11/620,709 (Platzer).

Office Action dated Jul. 8, 2009, received in U.S. Appl. No. 11/620,717 (Platzer).

Office Action dated Dec. 29, 2009, received in U.S. Appl. No. 11/620,717 (Platzer).

Notice of Allowance dated Jul. 20, 2010, received in U.S. Appl. No. 11/620,717 (Platzer).

Office Action dated Apr. 1, 2009, received in U.S. Appl. No. 11/620,723 (Platzer).

Final Office Action dated Nov. 17, 2009, received in U.S. Appl. No. 11/620,723 (Platzer).

Office Action dated Jun. 8, 2010, received in U.S. Appl. No. 11/620,723 (Platzer).

European Search Report dated Dec. 7, 2011, received in European Patent Application No. 11184186.2, which corresponds to U.S. Appl. No. 12/566,660 (Moore).

International Search Report and Written Opinion dated Dec. 13, 2011, received in International Patent Application No. PCT/US2011/039583, which corresponds to U.S. Appl. No. 12/892,848 (Dale).

European Search Report dated Nov. 23, 2011, received in European Patent Application No. 11184167.2, which corresponds to U.S. Appl. No. 12/042,318 (Beaver).

European Search Report dated Nov. 24, 2011, received in European Patent Application No. 11184169.8, which corresponds to U.S. Appl. No. 12/042,318 (Beaver).

European Search Report dated Nov. 18, 2011, received in European Patent Application No. 11184170.6, which corresponds to U.S. Appl. No. 12/042,318 (Beaver).

European Search Report dated Nov. 18, 2011, received in European Patent Application No. 11184172.2, which corresponds to U.S. Appl. No. 12/042,318 (Beaver).

European Search Report dated Nov. 30, 2011, received in European Patent Application No. 11184409.8, which corresponds to U.S. Appl. No. 12/042,318 (Beaver).

Office Action dated Dec. 9, 2011, received in U.S. Appl. No. 12/566,660 (Moore).

Office Action dated Dec. 13, 2011, received in Australian Patent Application No. 2011101154, which corresponds to U.S. Appl. No. 12/042,318 (Beaver).

Office Action dated Dec. 13, 2011, received in Australian Patent Application No. 2011101157, which corresponds to U.S. Appl. No. 12/042,318 (Beaver).

Office Action dated Dec. 13, 2011, received in Australian Patent Application No. 2011101156, which corresponds to U.S. Appl. No. 12/042,318 (Beaver).

Office Action dated Dec. 13, 2011, received in Australian Patent Application No. 2011101155, which corresponds to U.S. Appl. No. 12/042,318 (Beaver).

Office Action dated Oct. 24, 2011, received in Japanese Patent Application No. 2010-502356, which corresponds to U.S. Appl. No. 12/042,067 (Williamson).

* cited by examiner

TOUCH EVENT PROCESSING FOR WEB PAGES

CROSS-REFERENCE TO RELATED APPLICATIONS

The subject matter of this application is related to Application Ser. No. 12/042,067, for "Touch Event Model for Web Pages" filed Mar. 4, 2008, and application Ser. No. 12/042,299, for "Touch Event Model Programming Interface" filed Mar. 4, 2008, the contents of which are herein incorporated by reference.

TECHNICAL FIELD

This subject matter is generally related to web browsing services.

BACKGROUND

Web pages are created using a markup language which provides a means to describe a structure of text-based information in a document and to supplement that text with interactive forms, embedded images, and other objects. One popular markup language is HyperText Markup Language (HTML) which is written in the form of tags surrounded by angle brackets. HTML can describe the appearance and semantics of a web page, and can include embedded scripting language code (e.g., JavaScript®) which can affect the behavior of web browsers and other HTML processors. JavaScript® provides developers with the ability to add mouse event handlers or event listeners in a web page. These mouse event handlers can be assigned to specific regions of the web page and configured to receive mouse events in those regions, such as mouse up or mouse down events.

By contrast, web pages that are navigated with a touch sensitive device often need to respond to touch events generated by a user touching a web page with one or more fingers and making gestures. Conventional mouse event handlers cannot correctly interpret these touch events. Thus touch events require a different touch event model to correctly interpret touch events and to allow developers to fully utilize the capabilities of a touch sensitive display or device.

SUMMARY

One or more touch input signals can be obtained from a touch sensitive device. If the touch input signals are associated with one or more regions of a web page displayed on the touch sensitive device, a touch event associated with the regions of a web page is processed by the web page. If the touch input signals are not associated with the regions of a web page, an application associated with the touch sensitive device processes the touch input signals.

In some implementations, a method includes: receiving touch input signals; determining whether the touch input signals are associated with one or more regions of a web page displayed on a touch sensitive device; and forwarding for processing touch events to the webpage if the touch input signals are associated with the one or more regions of the web page.

Other implementations are disclosed which are directed to systems, methods and computer-readable mediums.

DETAILED DESCRIPTION

Example Web Page Structure and DOM

Figure 1A:
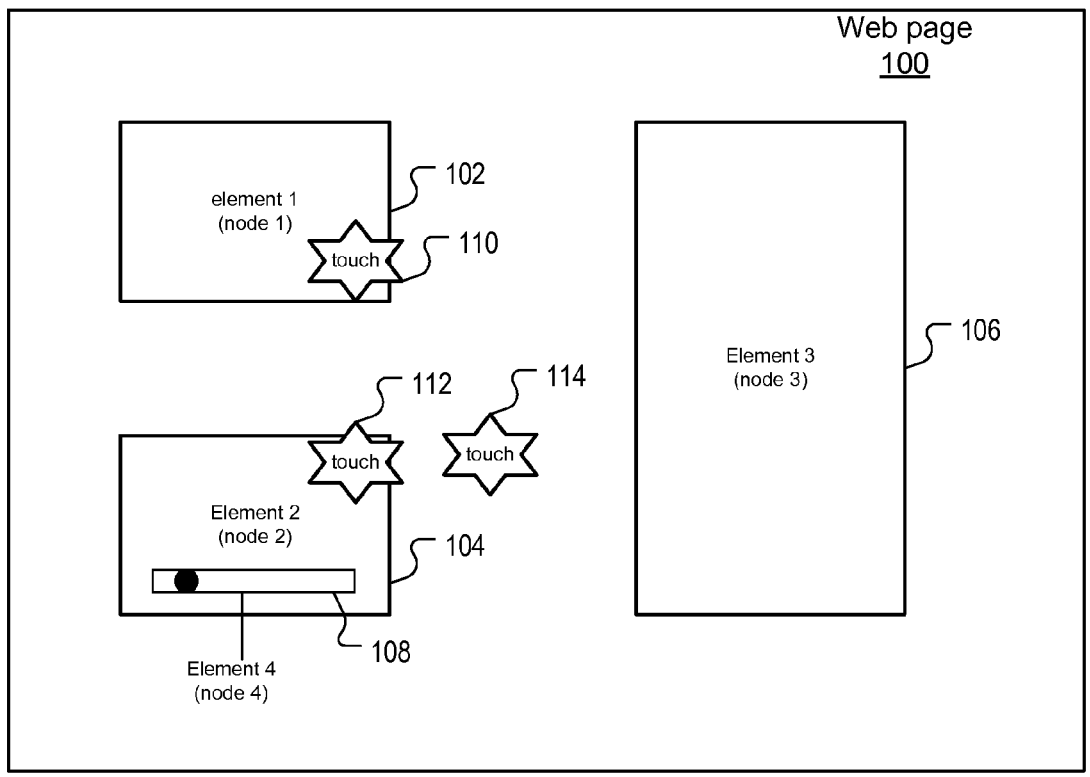
FIG. 1 illustrates an example web page document.

FIG. 1A shows an example web page 100 that can be displayed on a browser. The browser may be hosted on a portable device, such as the multi-touch capable device 400 of FIG. 4. One or more elements, element 102 ("element 1"), element 104 ("element 2"), and element 106 ("element 3") can be displayed on the web page 100. The elements 102, 104, 106 can correspond to regions of the web page 100 that a user can select and additional functionality can be provided as a result of the selection. The elements can, for example, correspond to buttons on the web page 100. The elements can also be nested so that one element contains another element. For example, element 104 contains element 108. In the example shown, the element 108 is a scrubber control nested within element 104 which can be a media player user interface, for example.

In some implementations, a user may perform various functions with the elements on the web page 100 using a finger instead of a mouse. The user can, for example, touch the elements of the web page 100 using the touch sensitive display 402 shown in FIG. 4. In one example, the user can select an element by touching the element with one or more fingers and/or making a gesture, such as a swiping, pinching or rotating motion. To recognize touch input signals, certain areas of the web page 100 may be associated with touch event handlers. This can be accomplished with a DOM and embedded scripting language, as will be described in reference to FIG. 1B.

Figure 1B:
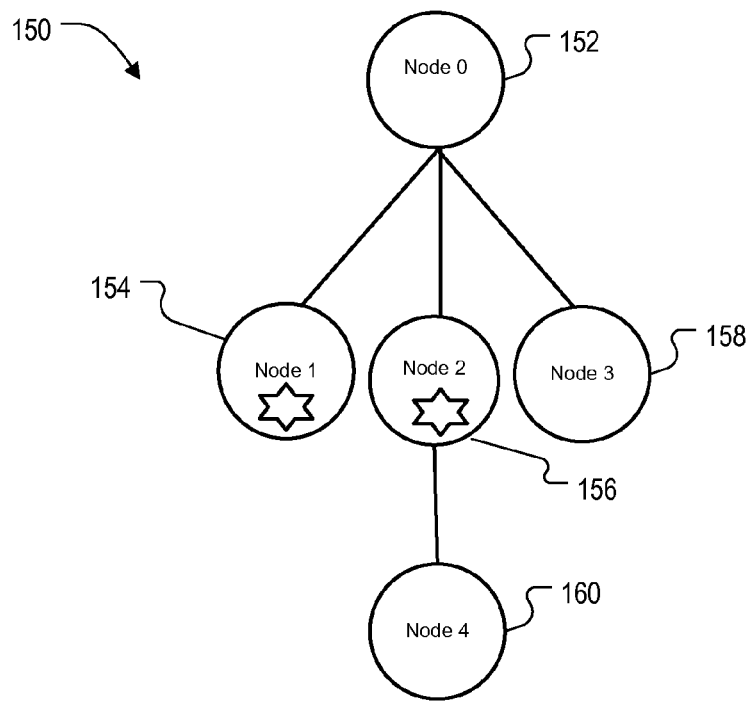

FIG. 1B is an exemplary DOM 150 associated with the web page 100. The DOM 150 provides a structural representation of the web page 100 and describes the web page content as a set of objects that a scripting language (e.g., JavaScript®) can interpret. In some implementations, the DOM 150 provides access to the structure of a web page by mapping the elements 102, 104, 106, 108 in the web page 100 to individual nodes of a tree. For example, element 102 corresponds to node 154. Element 104 corresponds to node 156. Element 106 corresponds to node 158. Element 108 corresponds to node 160. The root node 152 corresponds to the overall web page 100.

In some implementations, one or more elements 102, 104, 106, 108 in web page 100 can be associated with one or more corresponding touch event handlers by associating corresponding nodes in the DOM 150 with the touch event handlers. Touch event handlers can be inserted into HTML tags of the web page 100 and can execute a scripting language to perform an action when, for example, a user touches or gestures within one of the elements on the web page 100. For example, JavaScript® can work with the DOM 150 to attach actions to different touch events.

In some implementations, one or more elements 102, 104, 106, 108 can receive touch input which is detected by an event handler or listener. The touch input can be detected and processed into touch events by a touch event model which can be implemented in one or more layers of a software stack, as described in reference to FIG. 2. The touch events can be further processed by the web page 100. The touch events can be in a format (e.g., attributes) that are easier to use in an application than raw touch input signals generated by the touch sensitive device. For example, each touch event can include a set of coordinates at which a touch is currently occurring.

Each element in the web page 100, and its associated event handler, can receive, process, and handle touch events. For example, if driver 202 (FIG. 2) senses a touch point 110 associated with element 102, or a touch point 112 associated with element 104, the event handlers associated with elements 102 or 104 can each receive a separate touch event indicating that the element has been touched and can optionally send the touch event to the web page 100 for further processing. In some implementations, if a region of the web page 100 is touched that does not correspond to an event handler, a browser in the applications layer 214 can process the input, instead of the web page 100.

In some implementations, the browser in the applications layer 214 can receive all touch inputs. The browser can determine whether the touch inputs are associated with regions of the web page 100 that include a touch handler. If the touch inputs are associated with regions of the web page 100 that includes a touch handler, the touch event model can generate a touch event and send the touch event to the web page 100 for processing. If the touch inputs are not regions of the web page 100, the browser can process the touch inputs.

Referring to the example of FIG. 1, the user can touch the web page 100 at a second location while not releasing the first touch (e.g., while keeping a finger pressed down at the first touch point). For example, the user can touch the touch point 110 with a first finger and touch the touch point 112 with a second finger without releasing the first finger from touch point 110. Therefore, the second touch at touch point 112 can be contemporaneous with the touch at touch point 110. In this example, the browser determines that the touch points 110 and 112 are regions of the web page 100 that include touch handlers. Thus the touch event model generates a first touch event and a second touch event for the touch inputs at touch points 110 and 112, respectively, and sends the first and second touch events to the web page 100 for processing.

If the user, however, touches the web page 100 at a third location (e.g., touch point 114). The browser determines that the touch is not associated with a region of the web page 100 that is associated with a touch handler. In this case, the browser does not send any touch events to web page 100 for processing. Rather, the browser processes the events itself.

In some implementations, if the browser is associated with touch handlers, the browser may process the input according to the touch handlers associated with the browser. For example, a browser can be associated with touch handlers that allow a user to zoom in and out of the display of the browser.

In some implementations, a touch event can be detected per finger per node in the DOM 150. For example, a user can touch the touch sensitive display 402 at touch point 110 and touch point 112 at substantially the same time, and two separate touch events can be detected by the touch event model. A separate touch event can be detected for touch point 110 and touch point 112 because each node 102 and node 104 in the DOM 150 are associated with a separate touch event handler.

In some implementations, touch events can be delivered to the web page 100 as EventTargets. Some examples of touch events can include touchstart, touchmove, touchend, and touchcancel. Other touch events are possible. Touchstart is a touch event that is detected when a user first places a finger on the touch sensitive display 402 in a region on the web page 100 that is associated with an event handler. When the user moves his finger around on the web page 100, one or more touchmove events can be detected. When the user raises his finger off of the web page 100, a touchend event is detected. The touchcancel can be detected when the system interrupts regular event handling. For example, a touchcancel event can occur when the touch sensitive display 402 is locked out to prevent inadvertent touches.

In some implementations, gesture events can also be detected by combining two or more touch events. Like touch events, the gesture events (GestureEvents) can also be delivered to the web page 100 as EventTargets. Some examples of gesture events can be gesturestart, gesturechange, and gestureend. The gesture events can contain scale and/or rotation information. The rotation information can include a rotation value that is a relative delta in degrees. An element on the webpage 100 can be dynamically rotated base on the rotation value. The scale information can also include a scaling value that is a relative delta in document pixels. An element on the webpage 100 associated with the gesture event can be dynamically resized based on the scaling value. Other gesture events are possible.

In some implementations, a touch list can be received that includes touch event data to identify one or more touches on the web page 100. The touch event data can include a touch identifier and at least one set of touch location coordinates. The touch list can also include touch event data to a touch event target associated with each touch. In some implementations, the one set of touch location coordinates can include client coordinates, page coordinates, and screen coordinates. In some implementations, the touch event data can identify one or more changed touches.

In some implementations, GestureEvents can be sent to the web page 100 before TouchEvents. For example, if a user places fingers on touch point 110 and touch point 112, then makes a rotating gesture with those fingers clockwise or counterclockwise on the touch sensitive display, the touch event model detects these multiple touch events and combines the touch events into a gesture event. The gesture event can then be sent to the web page 100, followed by the touch events that were combined to form the gesture event. This way, a developer has access to a gesture event and the individual touch events of the gesture event which provides the developer with more flexibility when developing a web application.

In some implementations, the touch events are received in the following order: a touchstart event, one or more touchmove events and a touchend or touchcancel event. Using the example of FIG. 1A, when the user touches touch point 110, a first touchstart event is detected by a first touch event handler associated with element 102. When the user touches touch point 112, a second touchstart event is detected by a second touch event handler associated with element 104. As the user rotates her fingers without lifting her fingers, the first and second touch event handlers detect touchmove events which can be interpreted by the touch event model as a rotation gesture event. When the user finishes the rotation and lifts her fingers from the web page 100, the first and second touch event handlers detect touchend events. All or some of these touch events can be made available to developers through a touch event Application Programming Interface (API). The touch API can be made available to developers as a Software Development Kit (SDK) or as part of an application (e.g., as part of a browser tool kit). The touch event API can rely on other services, frameworks and an operating system to perform its various functions. These services, frameworks and operating system can be part of a software or processing stack, as described in reference to FIG. 2 where the touch events are associated with attributes that can be inserted in documents to define event actions in an application.

Example IDL

An example touch event model will now be described in Interface Description Language (IDL). The functionality and data structures of the IDL can be accessed through an API by a web designer or application developer. Access to touch events and/or gesture events can be associated with attributes that can be inserted in an markup language document (e.g., HTML, XML) to define event actions in an application. For example, the attributes can be inserted in one or more HTML tags in an HTML document for generating the web page displayed on the touch sensitive display 402. The event actions can include running an embedded script (e.g., JavaScript®).

```
interface [
    Conditional=TOUCH_EVENTS,
    GenerateConstructor
] TouchEvent : UIEvent {
    void initTouchEvent(in AtomicString type,
            in boolean canBubble,
            in boolean cancelable,
            in DOMWindow view,
            in long detail,
            in long screenX,
            in long screenY,
            in long clientX,
            in long clientY,
            in boolean ctrlKey,
            in boolean altKey,
            in boolean shiftKey,
            in boolean metaKey,
            in TouchList touches,
            in TouchList targetTouches,
            in TouchList changedTouches,
            in long scale,
            in long rotation);
    readonly attribute TouchList touches;        // all touches
    readonly attribute TouchList targetTouches;  // all touches in this
TouchEvent Target
    readonly attribute TouchList changedTouches; // all touches changed in
the current event
    readonly attribute long scale;
    readonly attribute long rotation;
    readonly attribute boolean ctrlKey;
    readonly attribute boolean shiftKey;
    readonly attribute boolean altKey;
    readonly attribute boolean metaKey;
};
interface [
    Conditional=TOUCH_EVENTS,
] Touch {
    readonly attribute EventTarget target;
    readonly attribute long identifier;
    readonly attribute long clientX;
    readonly attribute long clientY;
    readonly attribute long pageX;
    readonly attribute long pageY;
    readonly attribute long screenX;
    readonly attribute long screenY;
};
interface [
    Conditional=TOUCH_EVENTS,
    HasIndexGetter,
] TouchList {
    readonly attribute unsigned long length;
    Touch    item(in unsigned long index);
};
interface [
    Conditional=TOUCH_EVENTS,
    GenerateConstructor
] GestureEvent : UIEvent {
```

-continued

```
    void initGestureEvent( in AtomicString type,
            in boolean canBubble,
            in boolean cancelable,
            in DOMWindow view,
            in long detail,
            in long screenX,
            in long screenY,
            in long clientX,
            in long clientY,
            in boolean ctrlKey,
            in boolean altKey,
            in boolean shiftKey,
            in boolean metaKey,
            in EventTarget target,
            in long scale,
            in long rotation);
    readonly attribute EventTarget target;
    readonly attribute long scale;
    readonly attribute long rotation;
    readonly attribute boolean ctrlKey;
    readonly attribute boolean shiftKey;
    readonly attribute boolean altKey;
    readonly attribute boolean metaKey;
};
In Document.idl:
Touch    createTouch(in EventTarget target,
            in long identifier,
            in long clientX,
            in long clientY,
            in long pageX,
            in long pageY,
            in long screenX,
            in long screenY)
    raises (DOMException);
[Custom] TouchList    createTouchList( )
    raises (DOMException);
```

The following is example of HTML code snippet for processing touch events using the example IDL above. The HTML below shows, for example, that the touch event listener TouchStart and GestureStart were added to an element with the HTML code:
this.element.addEventListener('touchstart', function(e) {return self.onTouchBegin(e)}, false);
this.element.addEventListener('gesturestart', function(e) {return self.onGestureStart(e)}, false);

The HTML code corresponding to the IDL above may be as follows:

```
<!DOCTYPE html PUBLIC "-//W3C//DTD HTML 4.01 Transitional//EN"
"http://www.w3.org/TR/html4/loose.dtd">
<html lang="en">
    <head>
        <meta http-equiv="Content-Type" content="text/html; charset=utf-8">
        <meta name="viewport" content="initial-scale=1.0" />
        <title>Transform Gestures</title>
        <style type="text/css" media="screen">
            .box {
                position: absolute;
                height: 150px;
                width: 150px;
                background-color: blue;
            }
            .box:active {
                background-color: red;
            }
            body {
                margin: 0px;
            }
            #container {
                position: absolute;
                width: 100%;
                height: 100%;
            }
```

```
        #main-box2 {
            top: 10px;
            left: 155px;
            background: red;
            z-index: 1;
        }
    </style>
    <script type="text/javascript" charset="utf-8">
        var trackedObjectCount = 0;
        function Box(inElement)
        {
            var self = this;
            this.element = inElement;
            this.scale = 1.0;
            this.rotation = 0;
            this.position = '0,0';
            this.element.addEventListener('touchstart', function(e)
{ return self.onTouchStart(e) }, false);
            this.element.addEventListener('gesturestart', function(e)
{ return self.onGestureStart(e) }, false);
        }
        Box.prototype = {
            // position strings are "x,y" with no units
            get position( )
            {
                return this._position;
            },
            set position(pos)
            {
                this._position = pos;
                var components = pos.split(',')
                var x = components[0];
                var y = components[1];
                const kUseTransform = true;
                if (kUseTransform) {
                    this.element.style.webkitTransform =
'rotate(' + this.rotation + 'deg) scale(' + this.scale + ')
translate(' + x + 'px, ' + y + 'px)';
                }
                else {
                    this.element.style.left = x + 'px';
                    this.element.style.top = y + 'px';
                }
            },
            get x( )
            {
                return parseInt(this._position.split(',')[0]);
            },
            set x(inX)
            {
                var comps = this._position.split(',');
                comps[0] = inX;
                this.position = comps.join(',');
            },
            get y( )
            {
                return parseInt(this._position.split(',')[1]);
            },
            set y(inY)
            {
                var comps = this._position.split(',');
                comps[1] = inY;
                this.position = comps.join(',');
            },
            filterEvent: function(e)
            {
                // Prevent the browser from doing its default thing
(scroll, zoom)
                e.preventDefault( );
                // Event listeners are added at the document level, so we
receive gesturechange events for other elements.
                return (e.target == this.element);
            },
            onTouchStart: function(e)
            {
                if (!this.filterEvent(e))
                    return false;
                // Start tracking when the first finger comes down in this
element
                if (e.targetTouches.length != 1)
                    return false;
                this.startX = e.targetTouches[0].clientX;
                this.startY = e.targetTouches[0].clientY;
                var self = this;
                if (!("touchMoveHandler" in this)) {
                    this.touchMoveHandler = function(e)
{ return self.onTouchMove(e) }
                    this.touchEndHandler = function(e)
{ return self.onTouchEnd(e) }
                }
                document.addEventListener('touchmove',
this.touchMoveHandler, false);
                document.addEventListener('touchend',
this.touchEndHandler, false);
                trackedObjectCount++;
                return false;
            },
            onTouchMove: function(e)
            {
                if (!this.filterEvent(e))
                    return false;
                // Don't track motion when multiple touches are down
in this element (that's a gesture)
                if (e.targetTouches.length != 1)
                    return false;
                var leftDelta = e.targetTouches[0].clientX – this.startX;
                var topDelta = e.targetTouches[0].clientY – this.startY;
                var newLeft = (this.x) + leftDelta;
                var newTop = (this.y) + topDelta;
                this.position = newLeft + ',' + newTop;
                this.startX = e.targetTouches[0].clientX;
                this.startY = e.targetTouches[0].clientY;
                return false;
            },
            onTouchEnd: function(e)
            {
                if (!this.filterEvent(e))
                    return false;
                // Stop tracking when the last finger is removed from this
element
                if (e.targetTouches.length > 0)
                    return false;
                document.removeEventListener('touchmove',
this.touchMoveHandler, false);
                document.removeEventListener('touchend',
this.touchEndHandler, false);
                trackedObjectCount--;
                return false;
            },
            onGestureStart: function(e)
            {
                if (!this.filterEvent(e))
                    return false;
                var self = this;
                if (!("gestureChangeHandler" in this)) {
                    this.gestureChangeHandler = function(e)
{ return self.onGestureChange(e) }
                    this.gestureEndHandler = function(e)
{ return self.onGestureEnd(e) }
                }
                document.addEventListener('gesturechange',
this.gestureChangeHandler, true);
                document.addEventListener('gestureend',
this.gestureEndHandler, true);
                return false;
            },
            onGestureChange: function(e)
            {
                if (!this.filterEvent(e))
                    return false;
                // Only interpret gestures when tracking one object.
Otherwise, interpret raw touch events
                // to move the tracked objects.
                if (trackedObjectCount == 1) {
                    this.scale += e.scaling * 0.01;
                    this.rotation += e.rotation / 2;
                    this.position = this.position;
                }
                return false;
            },
```

```
        onGestureEnd: function(e)
        {
            if (!this.filterEvent(e))
                return false;
            document.removeEventListener('gesturechange',
this.gestureChangeHandler, true);
            document.removeEventListener('gestureend',
this.gestureEndHandler, true);
            return false;
        },
    }
    function loaded( )
    {
        new Box(document.getElementById('main-box'));
        new Box(document.getElementById('main-box2'));
    }
    window.addEventListener('load', loaded, true);
    </script>
</head>
<body>
    <div id="container">
        <div id="main-box" class="box"></div>
        <div id="main-box2" class="box"></div>
    </div>
</body>
</html>
```

Example Processing Stack for Multi-Touch Device

Figure 2:
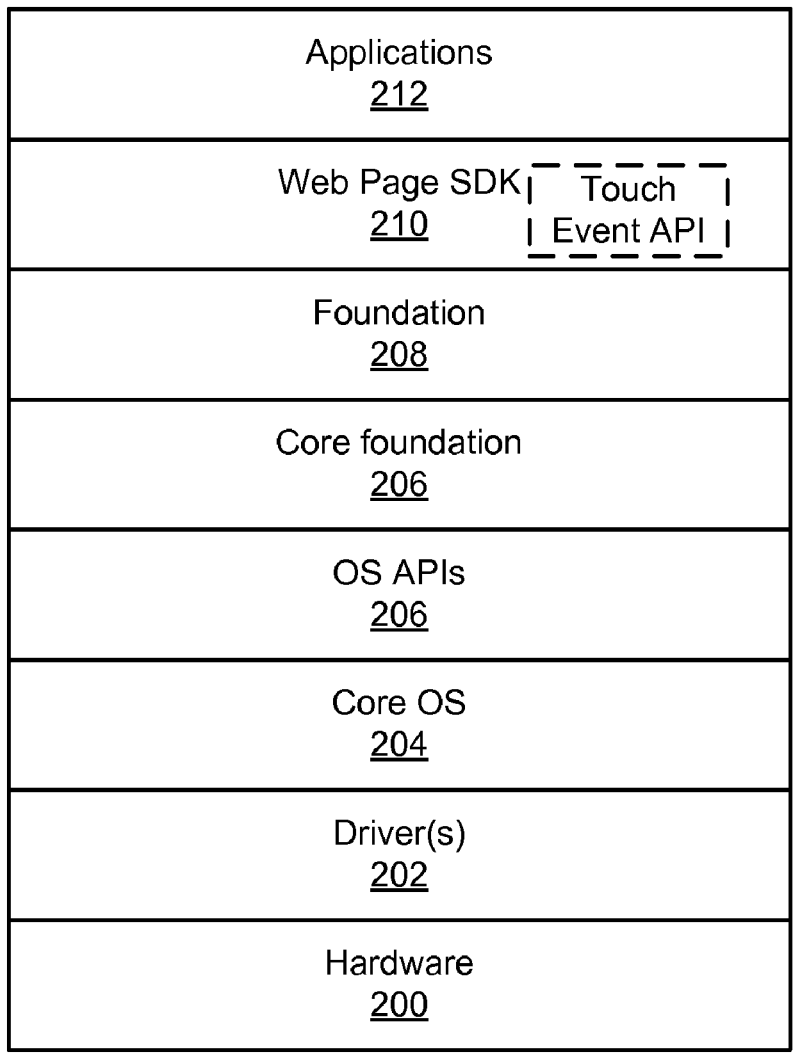
FIG. 2 illustrates a processing stack of an example multi-touch capable device.

FIG. 2 is a diagram of a processing stack of an example multi-touch capable device. The touch event model described above can be implemented in one or more regions of the processing stack and user various resources in the stack. The hardware 200 layer can include various hardware interface components, such as a touch sensitive or enabled device or touch sensitive display. The touch sensitive device can include a display and a panel that senses multiple touches simultaneously. The hardware layer 200 can also include an accelerometer for detecting an orientation of the touch sensitive display or device (e.g., portrait, landscape). Thus signals indicative of orientation can be used by the touch event model to scale web pages for optimum display.

One or more drivers in a driver layer 202 can communicate with the hardware 200. For example, the drivers can receive and process touch input signals generated by the touch sensitive display or device in the hardware layer 200. A core Operating System (OS) 204 can communicate with the driver(s). The core OS 204 can process raw input data received from the driver(s). In some embodiments, the drivers can be considered to be a part of the core OS 204.

A set of OS application programming interfaces (APIs) 206 can communicate with the core OS 204. These APIs can be a set of APIs that are usually included with operating systems (such as, for example, Linux or UNIX APIs). A set of core foundation APIs 208 can utilize the OS APIs 206, and a set of foundation APIs 210 can utilize the core foundation APIs 208.

Web page software development kit (SDK) 210 can include a set of APIs designed for use by applications running on the device. The touch event APIs can, for example, be included in the Web page SDK 210. The APIs of the Web page SDK 210 can utilize the foundation APIs 208. The Web page SDK 210 can, for example, include Web KIT provided by Apple Inc.® The Web page SDK 210 can be offered as an API or can be accessible through an application, for example, a browser such as SAFARI®, provided by Apple Inc.®

Applications 214 running on the device can utilize the APIs of the Web page SDK 210 to create web pages. The APIs of the Web page SDK 210 can, in turn, communicate with lower level elements, ultimately communicating with the touch sensitive display or device and various other user interface hardware. While each layer can utilize the layer underneath it, that is not always required. For example, in some embodiments, applications 214 can occasionally communicate with OS APIs 206.

Example Touch Event Optimization Process

Figure 3:
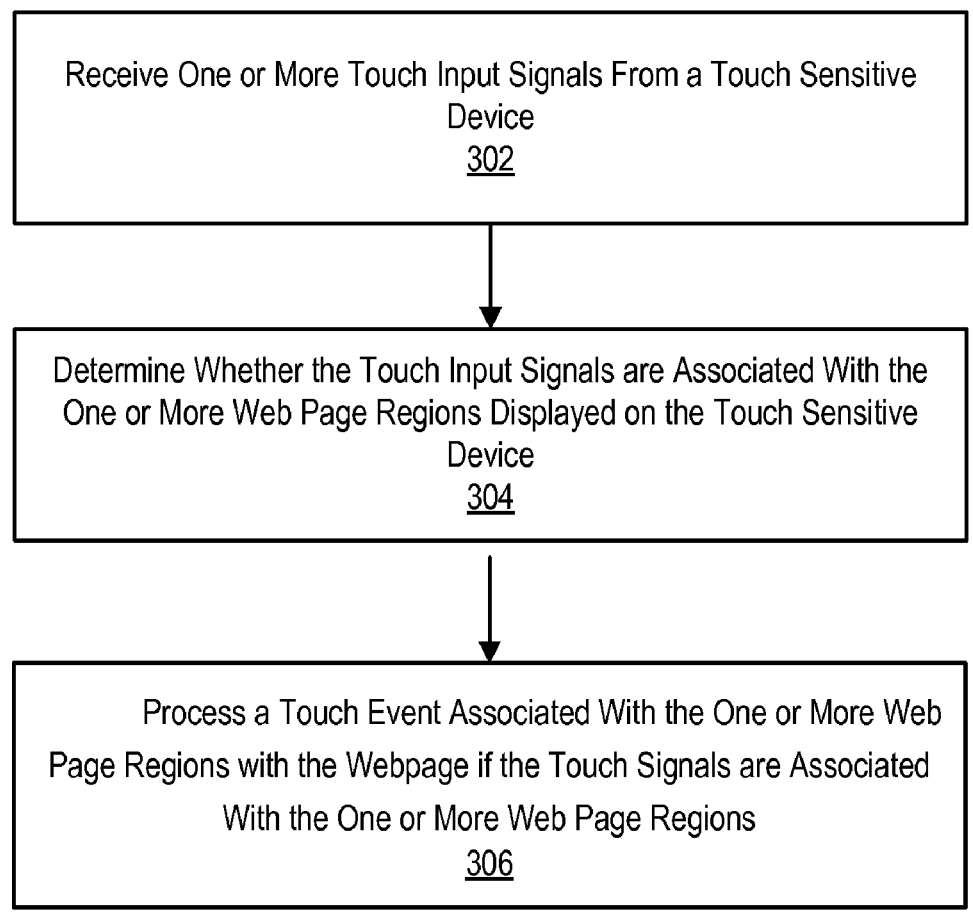
FIG. 3 is a flow diagram of an example process for processing touch events.

FIG. 3 is a flow diagram of a process 300 for optimizing the processing of touch events. The process 300 begins by receiving touch input signals from a touch sensitive device (302). A determination of whether the touch input signals are associated with one or more regions of a web page displayed on the touch sensitive device is made (304). The one or more regions of the web page can be associated with touch events. The determination can, for example, be made by an application (e.g., a browser) associated with the touch sensitive device. The touch events associated with the one or more regions of the web page can be processed with the web page if the touch signals are associated with the one or more regions of the web page (306). The application can process the touch signals if the touch signals are not associated with the one or more regions of the web page.

Mobile Device Overview

Figure 4:
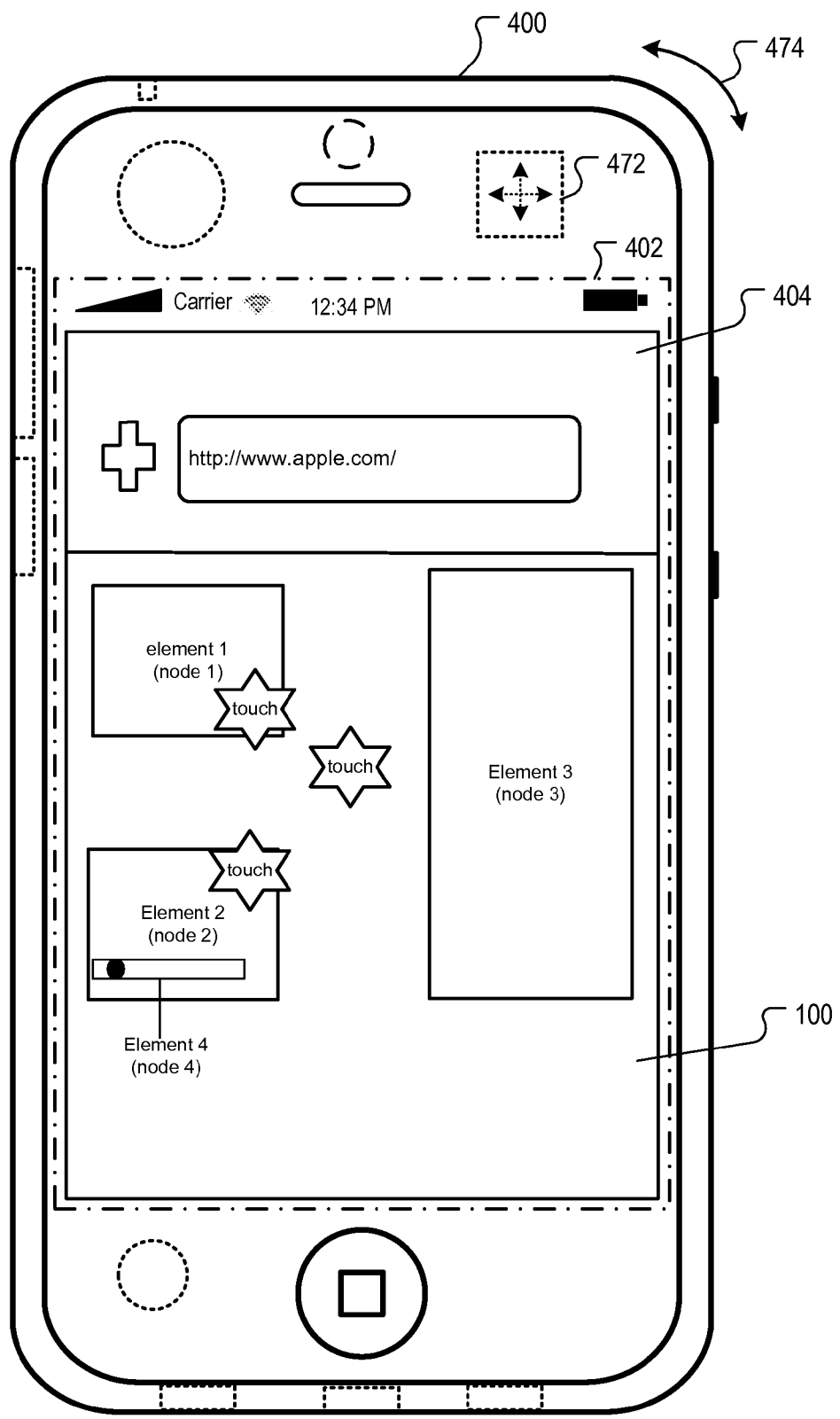
FIG. 4 illustrates an example multi-touch capable device.

FIG. 4 is a block diagram of an example multi-touch capable device 400. In some implementations, the multi-touch capable device 400 includes a touch sensitive display 402. The touch sensitive display 402 can implement liquid crystal display (LCD) technology, light emitting polymer display (LPD) technology, or some other display technology. The touch sensitive display 402 can be sensitive to haptic and/or tactile contact with a user.

In some implementations, the touch sensitive display 402 can comprise a multi-touch sensitive display 402. A touch sensitive display 402 can, for example, process multiple simultaneous touch points, including processing data related to the pressure, degree and/or position of each touch point. Such processing facilitates gestures and interactions with multiple fingers, chording, and other interactions. Other touch sensitive display technologies can also be used, e.g., a display in which contact is made using a stylus or other pointing device. Some examples of multi-touch sensitive display technology are described in U.S. Pat. Nos. 6,323,846, 6,570,557, 6,677,932, and U.S. Patent Publication 2002/0015024A1, each of which is incorporated by reference herein in its entirety. In some implementations, the multi-touch capable device 400 can display one or more graphical user interfaces on the touch sensitive display 402 for providing the user access to various system objects and for conveying information to the user.

Example Multi-Touch Capable Device Functionality

In some implementations, the multi-touch capable device 400 can implement multiple device functionalities, such as a telephony device, an e-mail device, a network data communication device, a Wi-Fi base station device, and a media processing device. In some implementations, the multi-touch capable device 400 can include a web browser 404 for displaying web pages (e.g., web page 100). The touch sensitive display 402 can receive touch input signals made on the web page 100 and the touch model described above can be used to determine touch and/or gesture events based on the touch input signals. In some implementations, the multi-touch capable device 400 can implement network distribution functionality. In some implementations, the touch sensitive display 402 can be locked down when the multi-touch capable device 400 is proximate to the user's ear. This lockdown would cause a touchcancel event as described in reference to FIG. 1B.

In some implementations, an accelerometer 472 can be utilized to detect movement of the multi-touch capable device 400, as indicated by the directional arrow 474. Accordingly, display objects and/or media can be presented according to a detected orientation, e.g., portrait or landscape. In some implementations, the multi-touch capable device 400 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the multi-touch capable device 400 or provided as a separate device that can be coupled to the multi-touch capable device 400 through an interface to provide access to location-based services. The multi-touch capable device 400 can also include one or more wireless communication subsystems.

In some implementations, a port device, e.g., a Universal Serial Bus (USB) port, or a docking port, or some other wired port connection, can be included. The port device can, for example, be utilized to establish a wired connection to other computing devices, such as other multi-touch capable devices 400, network access devices, a personal computer, a printer, or other processing devices capable of receiving and/or transmitting data. In some implementations, the port device allows the multi-touch capable device 400 to synchronize with a host device using one or more protocols, such as, for example, the TCP/IP, HTTP, UDP and any other known protocol.

Network Operating Environment

Figure 5:
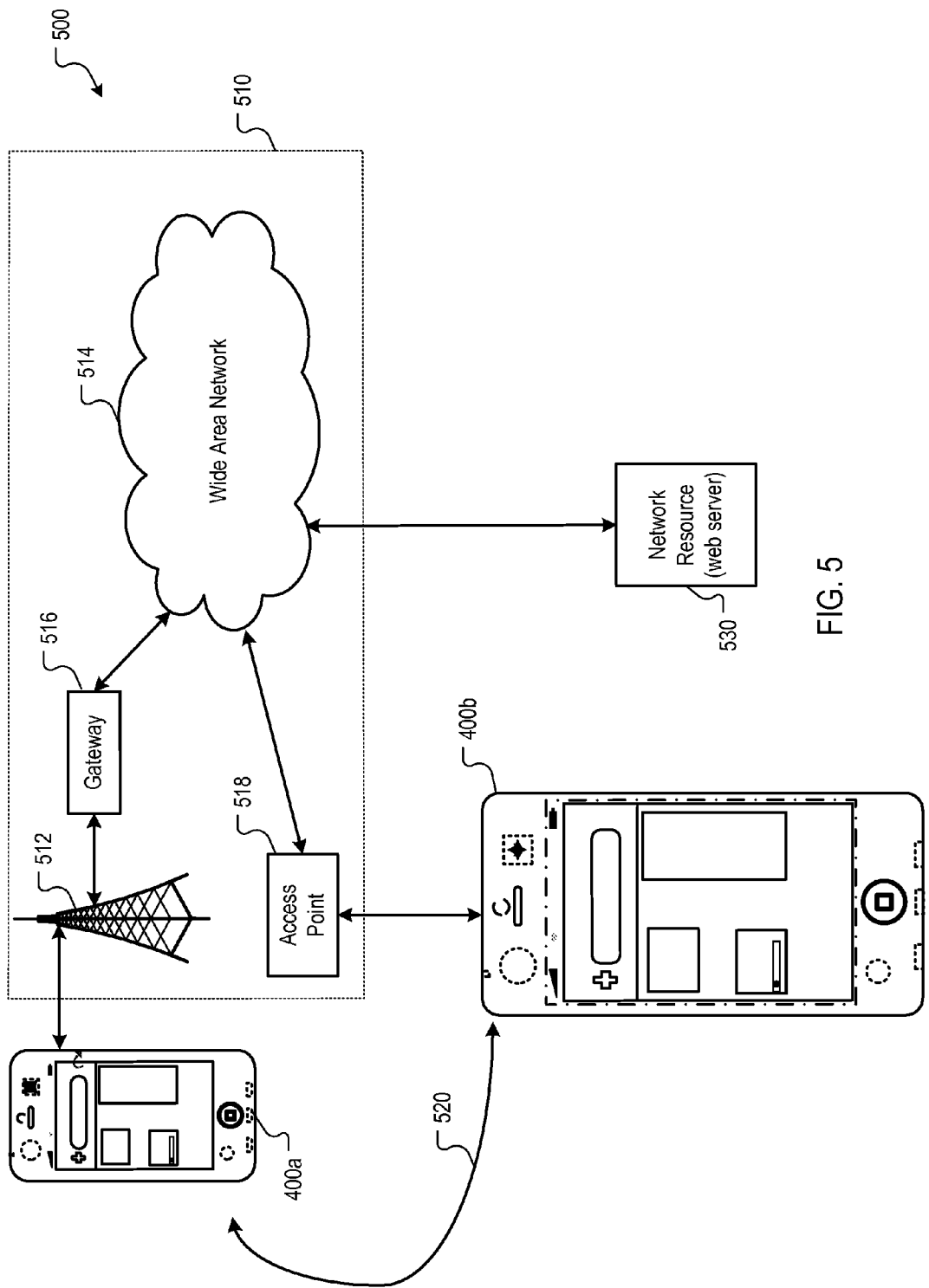
FIG. 5 is a block diagram of an example network operating environment for the multi-touch capable device of FIG. 4.

FIG. 5 is a block diagram of an example network operating environment 600 for the multi-touch capable device 400 of FIG. 4. The multi-touch capable device 400 of FIG. 4 can, for example, communicate over one or more wired and/or wireless networks 510 in data communication. For example, a wireless network 512, e.g., a cellular network, can communicate with a wide area network (WAN) 514, such as the Internet, by use of a gateway 516. Likewise, an access point 518, such as an 802.11g wireless access point, can provide communication access to the wide area network 514. In some implementations, both voice and data communications can be established over the wireless network 512 and the access point 518. For example, the multi-touch capable device 400a can place and receive phone calls (e.g., using VoIP protocols), send and receive e-mail messages (e.g., using POP3 protocol), and retrieve electronic documents and/or streams, such as web pages, photographs, and videos, over the wireless network 512, gateway 516, and wide area network 514 (e.g., using TCP/IP or UDP protocols). Likewise, the multi-touch capable device 400b can place and receive phone calls, send and receive e-mail messages, and retrieve electronic documents over the access point 518 and the wide area network 514. In some implementations, the multi-touch capable device 400 can be physically connected to the access point 518 using one or more cables and the access point 518 can be a personal computer. In this configuration, the multi-touch capable device 400 can be referred to as a "tethered" device.

The multi-touch capable devices 400a and 400b can also establish communications by other means. For example, the multi-touch capable device 400a can communicate with other wireless devices, e.g., other multi-touch capable devices 400, cell phones, etc., over the wireless network 512. Likewise, the multi-touch capable device 400a and 400b can establish peer-to-peer communications 520, e.g., a personal area network, by use of one or more communication subsystems, such as the Bluetooth™ communication device 488 shown in FIG. 4. Other communication protocols and topologies can also be implemented.

The multi-touch capable device 400 can, for example, communicate with a network resource 530 over the one or more wired and/or wireless networks 510. For example, the network resource can be a web server for delivering web pages which can be touched via the touch model, as described in reference to FIGS. 1-2.

Other services can also be provided, including a software update service that automatically determines whether software updates exist for software on the multi-touch capable device 400, then downloads the software updates to the multi-touch capable device 400 where it can be manually or automatically unpacked and/or installed.

Example Mobile Device Architecture

Figure 6:
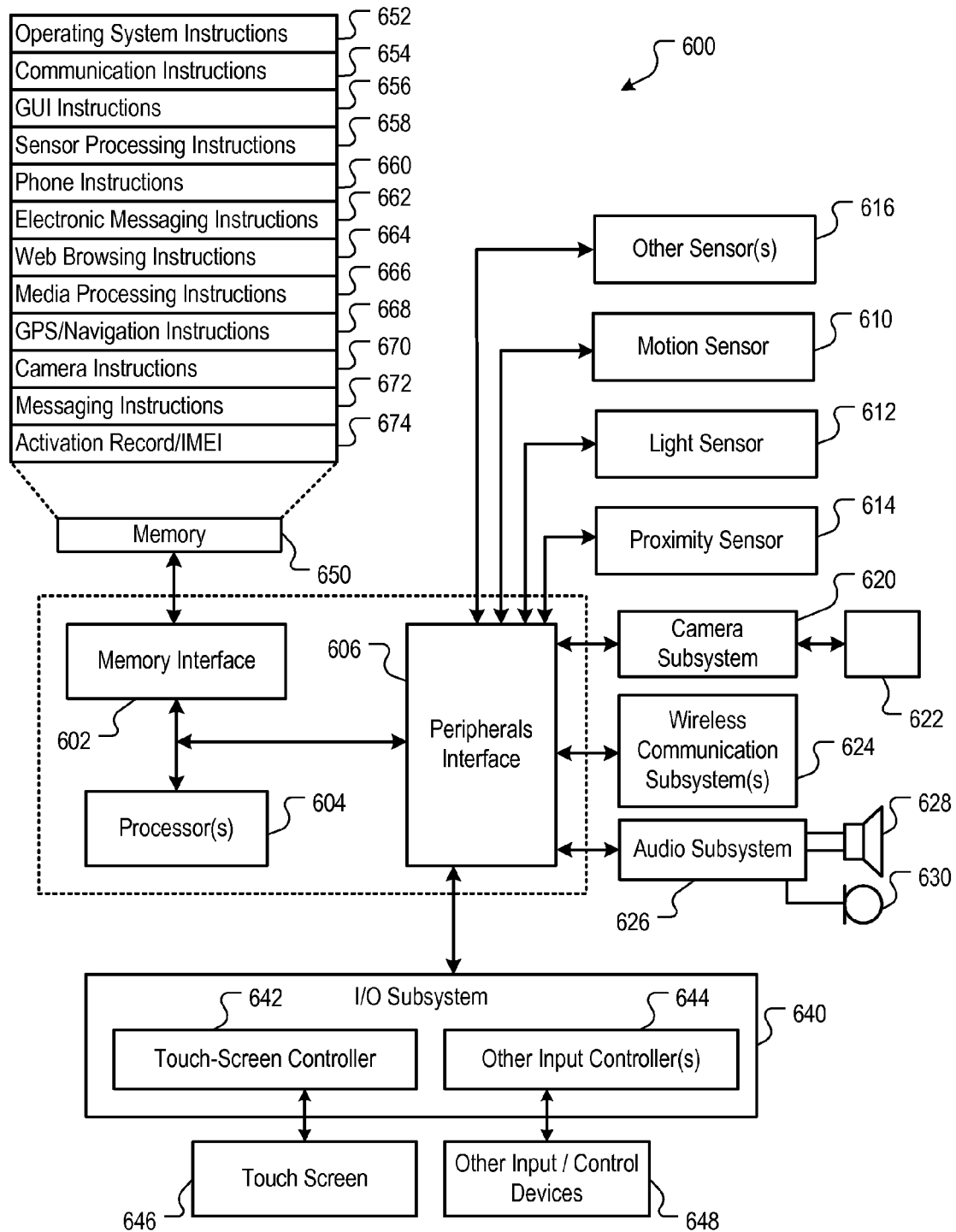
FIG. 6 is a block diagram of an example implementation of the multi-touch capable device of FIG. 4.

FIG. 6 is a block diagram 600 of an example implementation of the multi-touch capable device 400 of FIG. 4. The multi-touch capable device 400 can include a memory interface 602, one or more data processors, image processors and/or central processing units 604, and a peripherals interface 606. The memory interface 602, the one or more processors 604 and/or the peripherals interface 606 can be separate components or can be integrated in one or more integrated circuits. The various components in the multi-touch capable device 400 can be coupled by one or more communication buses or signal lines.

Sensors, devices and subsystems can be coupled to the peripherals interface 606 to facilitate multiple functionalities. For example, a motion sensor 610, a light sensor 612, and a proximity sensor 614 can be coupled to the peripherals interface 606 to facilitate the orientation, lighting and proximity functions described with respect to FIG. 4. Other sensors 616 can also be connected to the peripherals interface 606, such as a positioning system (e.g., GPS receiver), a temperature sensor, a biometric sensor, or other sensing device, to facilitate related functionalities.

A camera subsystem 620 and an optical sensor 622, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 624, which can include radio frequency receivers and transmitters and/or optical (e.g., infrared) receivers and transmitters. The specific design and implementation of the communication subsystem 624 can depend on the communication network(s) over which the multi-touch capable device 400 is intended to operate. For example, a multi-touch capable device 400 may include communication subsystems 624 designed to operate over a GSM network, a GPRS network, an EDGE network, a Wi-Fi or WiMax network, and a Bluetooth™ network. In particular, the wireless communication subsystems 624 may include hosting protocols such that the device 500 may be configured as a base station for other wireless devices.

An audio subsystem 626 can be coupled to a speaker 628 and a microphone 630 to facilitate voice-enabled functions, such as voice recognition, voice replication, digital recording, and telephony functions.

The I/O subsystem 640 can include a touch screen controller 642 and/or other input controller(s) 644. The touch-screen controller 642 can be coupled to a touch screen 646. The touch screen 646 and touch screen controller 642 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 646.

The other input controller(s) 644 can be coupled to other input/control devices 648, such as one or more buttons, rocker switches, thumb-wheel, infrared port, USB port, and/or a pointer device such as a stylus. The one or more buttons (not shown) can include an up/down button for volume control of the speaker 628 and/or the microphone 630.

In one implementation, a pressing of the button for a first duration may disengage a lock of the touch screen 646; and a pressing of the button for a second duration that is longer than the first duration may turn power to the multi-touch capable device 400 on or off. The user may be able to customize a functionality of one or more of the buttons. The touch screen 646 can, for example, also be used to implement virtual or soft buttons and/or a keypad or keyboard.

In some implementations, the multi-touch capable device 400 can present recorded audio and/or video files, such as MP3, AAC, and MPEG files. In some implementations, the multi-touch capable device 400 can include the functionality of an MP3 player, such as an iPod™. The multi-touch capable device 400 may, therefore, include a 32-pin connector that is compatible with the iPod. Other input/output and control devices can also be used.

The memory interface 602 can be coupled to memory 650. The memory 650 can include high-speed random access memory and/or non-volatile memory, such as one or more magnetic disk storage devices, one or more optical storage devices, and/or flash memory (e.g., NAND, NOR). The memory 650 can store an operating system 652, such as Darwin, RTXC, LINUX, UNIX, OS X, WINDOWS, or an embedded operating system such as VxWorks. The operating system 652 may include instructions for handling basic system services and for performing hardware dependent tasks.

The memory 650 may also store communication instructions 654 to facilitate communicating with one or more additional devices, one or more computers and/or one or more servers. The memory 650 may include graphical user interface instructions 656 to facilitate graphic user interface processing; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GPS/Navigation instructions 668 to facilitate GPS and navigation-related processes and instructions; camera instructions 670 to facilitate camera-related processes and functions; and/or other messaging instructions 672 to facilitate processes and functions, as described in reference to FIGS. 1-5.

Each of the above identified instructions and applications can correspond to a set of instructions for performing one or more functions described above. These instructions need not be implemented as separate software programs, procedures or modules. The memory 650 can include additional instructions or fewer instructions. Furthermore, various functions of the multi-touch capable device 400 may be implemented in hardware and/or in software, including in one or more signal processing and/or application specific integrated circuits.

The features described can be implemented in digital electronic circuitry, or in computer hardware, firmware, software, or in combinations of them. The features can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method, comprising:
    at a multi-touch capable device including one or more processors and memory storing a web page that includes instructions for processing one or more touch events and one or more gesture events:
        receiving touch input signals associated with multiple concurrent finger touches on one or more elements of the web page displayed on a touch sensitive device;
        processing the touch input signals to determine if the touch input signals are associated with a touch gesture made with respect to one or more elements of the web page; and
        if the touch input signals are associated with a touch gesture, forwarding a gesture event to the web page for further processing by executing the instructions stored in the web page.

2. The method of claim 1, further comprising:
    if the touch input signals are not associated with a touch gesture, processing the touch input signals with an application associated with the touch sensitive device.

3. The method of claim 1, where the one or more elements of the web page are associated with one or more nodes in a document object model (DOM) and the nodes are at a same or different hierarchical levels of the DOM.

4. The method of claim 1, where the gesture event comprises two or more touch events.

5. The method of claim 2, where the application is a browser.

6. The method of claim 1, where the gesture event is associated with attributes that can be inserted in documents to define event actions in the web page.

7. The method of claim 6, where the attributes are inserted in one or more HyperText Markup Language ("HTML") tags in an HTML document for generating the web page displayed on the touch sensitive device.

8. The method of claim 7, where processing the gesture event associated with the one or more elements of the web page comprises:
    processing the gesture event based on the HTML tag associated with the one or more elements of the web page.

9. The method of claim 1, where the gesture includes a sequence of touch events that include a touch start event, one or more touch move events and a touch end or touch cancel event.

10. The method of claim 1, where the gesture event includes at least two or more touch events that occur at substantially the same time.

11. A system comprising:
    a processor; and
    a computer-readable medium coupled to the processor, storing a web page that includes instructions for processing one or more touch events and one or more gesture events, and having instructions stored thereon, which, when executed by the processor, cause the processor to perform operations comprising:
        receiving touch input signals associated with multiple concurrent finger touches on one or more elements of the web page displayed on a touch sensitive device;
        processing the touch input signals to determine if the touch input signals are associated with a touch gesture made with respect to one or more elements of the web page; and
        if the touch input signals are associated with a touch gesture, forwarding a gesture event to the web page for further processing by executing the instructions stored in the web page.

12. The system of claim 11, wherein the operations include:
    if the touch input signals are not associated with a touch gesture, processing the touch input signals with an application associated with the touch sensitive device.

13. The system of claim 11, where the one or more elements of the web page are associated with one or more nodes in a document object model (DOM) and the nodes are at the same or different hierarchical levels of the DOM.

14. The system of claim 11, where the gesture event comprises two or more touch events.

15. The system of claim 12, where the application is a browser.

16. The system of claim 11, where the gesture event is associated with attributes that can be inserted in documents to define event actions in the web page.

17. The system of claim 16, where the attributes are inserted in one or more HyperText Markup Language ("HTML") tags in an HTML document for generating the web page displayed on the touch sensitive device.

18. The system of claim 17, wherein the operations include:
    processing the gesture event based on the HTML tag associated with the one or more elements of a web page.

19. The system of claim 11, where the gesture includes a sequence of touch events that include a touch start event, one or more touch move events and a touch end or touch cancel event.

20. The system of claim 11, where the gesture event includes at least two or more touch events that occur at substantially the same time.

21. A non-transitory computer-readable medium having instructions stored thereon, which, when executed by at least one processor, causes the processor to perform operations comprising:
    receiving touch input signals associated with multiple concurrent finger touches on one or more elements of a web page displayed on a touch sensitive device, the web page including instructions for processing one or more touch events and one or more gesture events;
    processing the touch input signals to determine if the touch input signals are associated with a touch gesture made with respect to the one or more elements of the web page; and if the touch input signals are associated with a touch gesture, forwarding a gesture event to the web page for further processing by executing instructions stored in the web page.

22. The non-transitory computer-readable medium of claim 21, wherein the operations include:

if the touch input signals are not associated with a touch gesture, processing the touch input signals with an application associated with the touch sensitive device.

* * * * *